(12) United States Patent
Schneider (10) Patent No.: US 9,178,956 B2
(45) Date of Patent: Nov. 3, 2015

(54) MEASURING WEB VISITORS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 584 days.

(21) Appl. No.: 12/154,365

(22) Filed: May 21, 2008

(65) Prior Publication Data

US 2009/0292803 A1 Nov. 26, 2009

(51) Int. Cl.
*G06F 15/173* (2006.01)
*H04L 29/08* (2006.01)
*G06Q 30/02* (2012.01)

(52) U.S. Cl.
CPC ............ *H04L 67/2814* (2013.01); *G06Q 30/02* (2013.01)

(58) Field of Classification Search
CPC .............................. H04L 67/22; H04L 43/062
USPC .................................................. 709/224, 223
See application file for complete search history.

(56) References Cited

U.S. PATENT DOCUMENTS

| 5,796,952 A * | 8/1998 | Davis et al. ................... 709/224 |
| 7,039,699 B1 * | 5/2006 | Narin et al. ................... 709/224 |
| 2002/0078191 A1 * | 6/2002 | Lorenz ........................... 709/223 |
| 2003/0208594 A1 * | 11/2003 | Muret et al. .................. 709/224 |

FOREIGN PATENT DOCUMENTS

WO    WO 0111506 A1 *  2/2001

* cited by examiner

*Primary Examiner* — Joon H Hwang
*Assistant Examiner* — Sherman Lin
(74) *Attorney, Agent, or Firm* — Lowenstein Sandler LLP (57) ABSTRACT

An apparatus and a method for tracking the number of hits to a web page is described. In one embodiment, a web browser of a client requests from a server a web page. The server redirects the web browser to a cookie counting web page, where the cookie counting web page provides a tracking cookie to the web browser. The server computes the number of unique hits to the web page without cookies based on the number of hits to the cookie counting web page without tracking cookies, the number of unique hits to the cookie counting web page with tracking cookies, the number of all hits to the cookie counting web page with tracking cookies.

21 Claims, 6 Drawing Sheets

MEASURING WEB VISITORS

TECHNICAL FIELD

Embodiments of the present invention relate to computing systems, and more particularly, to measuring web pages accesses.

BACKGROUND

Website providers are increasing the amount of advertising space on their webpages in order to generate more revenues. The advertisements (or ads) appear as banners, blocks, or tiles on various portions on the webpage.

One traditional method to monitor the activity of advertisements of a web page is to send one or more session identifiers in the form of HTTP cookies to a client web browser. Such cookies allows for the tracking of information on the client web browser. However, the client web browser is under no obligation to accept or send back these cookies. Security conscious users deliberately disable cookies from all or some web sites.

In the case where cookies are disabled, the number of visitors may be overcounted by counting the number of new cookies issued. Similarly, the number of visitors may also be undercounted by only counting the number of cookies returned by a number of users who cannot or will not send back cookies. As such, a need therefore exists for a technique to estimate the number of users who cannot or will not send back tracking cookies.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for tracking the number of hits to a web page is described. In one embodiment, a web browser of a client requests from a server a web page. The server redirects the web browser to a cookie counting web page, where the cookie counting web page provides a tracking cookie to the web browser. The server computes the number of unique hits to the web page without cookies based on the number of hits to the cookie counting web page without tracking cookies, the number of unique hits to the cookie counting web page with tracking cookies, the number of all hits to the cookie counting web page with tracking cookies.

Figure 1:
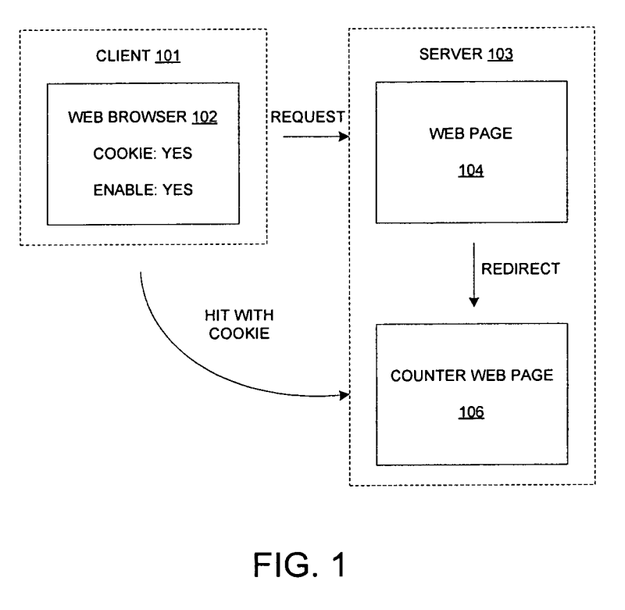
FIG. 1 is a block diagram illustrating one embodiment of a system for counting the number of hits to a web page.

FIG. 1 is a block diagram illustrating one embodiment of a system 100 for counting hits to a web page on a server. The system includes a client 101 communicating with a server 103. Those of ordinary skills in the art will recognize that the communication between client 101 and server 103 may be via any networking means such as the Internet. Client 101 includes a web browser 102 that requests a web page 104 from server 103. In one embodiment, web browser 102 includes cookie features that are enabled. In other words, web browser 102 may be set up to accept cookies. HTTP cookies, or more commonly referred to as Web cookies, tracking cookies or just cookies, are parcels of text sent by a server to a web browser and then sent back unchanged by the browser each time it accesses that server. HTTP cookies are used for authenticating, tracking, and maintaining specific information about users, such as site preferences or the contents of their electronic shopping carts. Most modern browsers allow users to decide whether to accept cookies, but rejection makes some websites unusable. For example, shopping baskets implemented using cookies do not work if cookies are rejected. In the example of FIG. 1, web browser 102 already includes a cookie associated with the server 103.

In one embodiment, server 103 stores the requested web page 104 and a counting web page 106. In another embodiment, counting web page 106 is stored on another server or in another storage from server 103. Upon receiving the request to access web page 104 from web browser 102, server 103 re-directs web browser 102 to a cookie counting URL such as counting web page 106. For example, when web browser 102 attempts to go to http://www.example.com, it gets redirected to http://www.example.com/?display (the cookie counting web page 106). The redirect would also need to provide a tracking cookie, if the original request from web browser 102 does not have one. In the example of FIG. 1, the request from web browser 102 also includes the cookie that was stored on client 101.

In one embodiment, counting URL web page 106 is on the same server as server 103. In another embodiment, counting URL web page 106 is on the same domain as the originally requested page, e.g. web page 104. In another embodiment, web server 103 serves the page directly rather than sending a redirect request back to web browser 102.

At the cookie counting URL web page 106, it can be safely assumed that web browser 102 was provided a cookie. The number of users who cannot or will not send tracking cookies back can be extrapolated from the behavior of conforming population (web browsers that return tracking cookies) to non-conforming population (web browsers that do not return tracking cookies). In one embodiment, such extrapolation may be computed by multiplying the hits that have no tracking cookie by the ratio of unique tracking cookies to all hits with tracking cookies to obtain a good approximation of the number of unique hits without tracking cookies.

In another embodiment, web page 104 includes banner advertisements. The above described computation scheme may be used to approximate the number of unique impressions and the total number of impressions.

Figure 2:
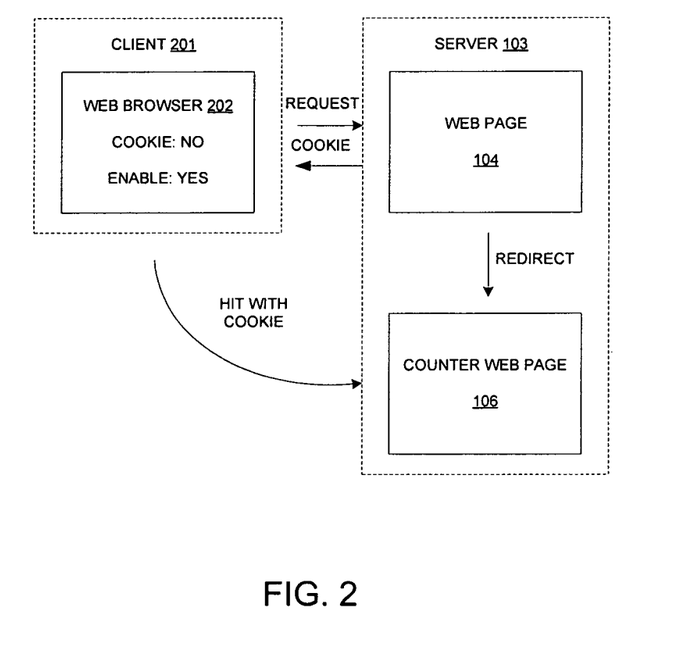
FIG. 2 is a block diagram illustrating another embodiment of a system for counting the number of hits to a web page.

FIG. 2 is a block diagram illustrating another embodiment of a system for counting the number of hits to a web page. The system includes a client 201 communicating with server 103. Client 201 includes a web browser 202 that requests web page 104 from server 103. In one embodiment, web browser 202 includes cookie features that are enabled. In other words, web browser 202 may be set up to accept cookies. In the example of FIG. 2, although already set up to accept cookies, web browser 202 does not includes any cookies associated with server 103. As such, the request from web browser 202 does not include a cookie.

Upon receiving the request to access web page 104 from web browser 202, server 103 re-directs web browser 202 to a cookie counting URL such as counting web page 106. The redirect provides a tracking cookie to web browser 202 since the original request from web browser 202 does not include a tracking cookie associated with web page 104.

At cookie counting URL web page 106, it can be safely assumed that web browser 202 was provided a tracking cookie. The number of users who cannot or will not send tracking cookies back can be extrapolated from the behavior of conforming population (web browsers that return tracking cookies) to non-conforming population (web browsers that do not return tracking cookies). In one embodiment, such extrapolation may be computed by multiplying the hits that have no tracking cookie by the ratio of unique tracking cookies to all hits with tracking cookies to obtain a good approximation of the number of unique hits without tracking cookies.

Figure 3:
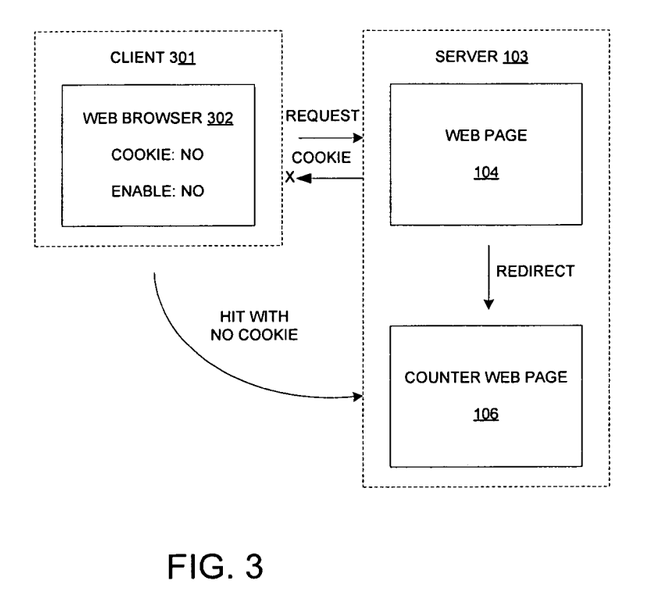
FIG. 3 is a block diagram illustrating yet another embodiment of a system for counting the number of hits to a web page.

FIG. 3 is a block diagram illustrating yet another embodiment of a system for counting the number of hits to a web page. The system includes a client 301 communicating with server 103. Client 301 includes a web browser 302 that requests web page 104 from server 103. In one embodiment, web browser 302 includes cookie features that are disabled. In other words, web browser 302 may be set up to reject cookies from web sites. In the example of FIG. 3, web browser 202 does not includes any cookies associated with server 103. As such, the request from web browser 302 does not include any cookies.

Upon receiving the request to access web page 104 from web browser 302, server 103 re-directs web browser 302 to a cookie counting URL such as counting web page 106. The redirect provides a tracking cookie to web browser 302 since the original request from web browser 302 did not include a tracking cookie associated with web page 104. However, because the cookie feature is disabled on web browser 302, such cookie is rejected from web browser 302.

At cookie counting URL web page 106, it can be safely assumed that web browser 302 was provided a tracking cookie. The number of users who cannot or will not send tracking cookies back can be extrapolated from the behavior of conforming population (web browsers that return tracking cookies) to non-conforming population (web browsers that do not return tracking cookies). In one embodiment, such extrapolation may be computed by multiplying the hits that have no tracking cookie by the ratio of unique tracking cookies to all hits with tracking cookies to obtain a good approximation of the number of unique hits without tracking cookies.

Figure 4:
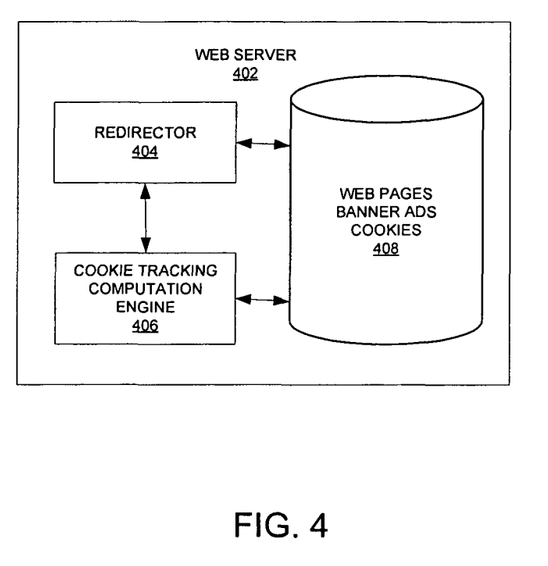
FIG. 4 is a block diagram illustrating one embodiment of a server.

FIG. 4 is a block diagram illustrating one embodiment of a server 402. In one embodiment, server 402 includes a redirector 404, a cookie tracking computation engine 406, and a storage 408. Redirector receives and redirects a request for a web page from a web browser of a client to a cookie counting web page. The cookie counting web page provides a tracking cookie to the web browser. Computation engine 406 computes the number of unique hits to the web page without cookies based on the number of hits to the cookie counting web page without tracking cookies, the number of unique hits to the cookie counting web page with tracking cookies, the number of all hits to the cookie counting web page with tracking cookies.

In one embodiment, computation engine 406 computes by multiplying the number of hits without tracking cookies to the cookie counting web page by the ratio of the number of unique hits with tracking cookies to the cookie counting web page to the number of all hits with tracking cookies to the cookie counting web page.

In one embodiment, storage 408 stores web pages, banner ads, cookies.

Figure 5:
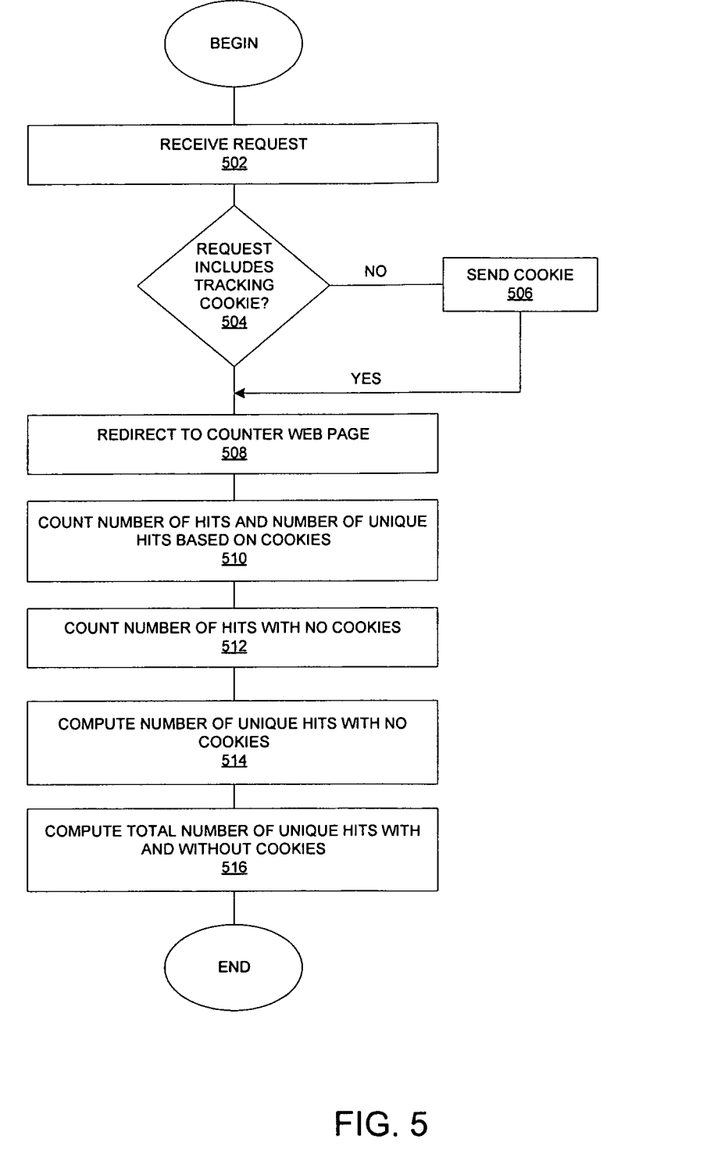
FIG. 5 is a flow diagram illustrating one embodiment of a method for counting hits to a web page on a server.

FIG. 5 is a flow diagram illustrating one embodiment of a method for counting online display advertisements. At 502, a web server receives a request for a web page from a web browser of a client. At 504, web server determines whether the request includes a tracking cookie. At 506, if the request includes a tracking cookie, it is forward to a cookie computation engine. At 508, the web browser is redirected to a URL of a cookie counting web page. At 510, the number of all hits and unique hits based on the received cookies are counted. At 512, the number of all hits without cookies is counted. At 514, the number of unique hits without cookies is counted. At 514, the number of unique hits with and without cookies are computed based on the algorithm described above.

Figure 6:
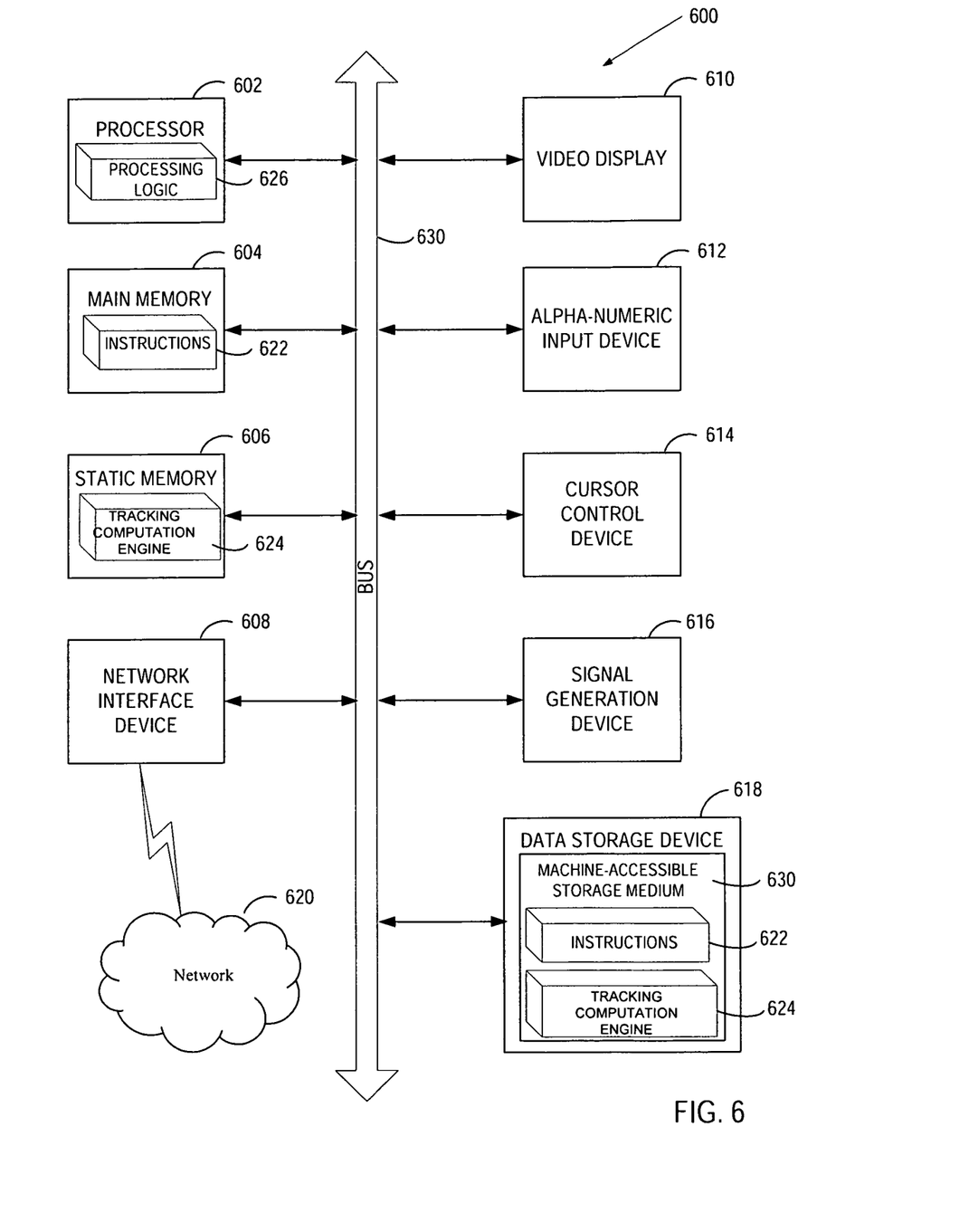
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The machine-accessible storage medium 630 may also be used to store the tracking computation engine 624 as presently described. The tracking computation engine 624 may also be stored in other sections of computer system 600, such as static memory 606.

While the machine-accessible storage medium 630 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device from a plurality of web browsers, a first plurality of requests for a web page and a second plurality of requests for the web page, wherein each of the first plurality of requests is associated with a tracking cookie returned by a web browser and each of the second plurality of requests is associated with a tracking cookie rejected by a web browser;
    determining a number of total tracked hits to the web page corresponding to a number of requests in the first plurality of requests;
    determining a number of unique tracked hits to the web page corresponding to a number of unique web browsers of the first plurality of requests, wherein the number of unique web browsers of the first plurality of requests is determined in view of the returned tracking cookies;
    determining a number of total untracked hits to the web page corresponding to a number of requests in the second plurality of requests; and
    estimating, by the processing device, a number of unique untracked hits to the web page corresponding to a number of unique web browsers of the second plurality of requests, wherein the number of unique untracked hits to the webpage is estimated in view of the number of total untracked hits to the web page, the number of unique tracked hits to the web page, and the number of total tracked hits to the web page.

2. The method of claim 1, wherein at least one of the web browsers of the first plurality of requests has cookies features enabled.

3. The method of claim 2, wherein at least one of the requests of the first plurality of requests comprises a previously stored tracking cookie associated with the web page.

4. The method of claim 1, wherein the number of unique tracked hits to the web page is in view of a number of unique tracked hits to the web page during a predetermined time period.

5. The method of claim 1, wherein the web page is a counting web page, further comprising:

receiving a plurality of requests for a main web page from the plurality of web browsers;

determining whether each of the plurality of requests for the main web page comprises a tracking cookie;

selectively, in view of the determining, providing a tracking cookie to the plurality of web browsers; and redirecting the web browsers to the counting web page.

6. The method of claim 1, wherein the number of unique untracked hits is estimated by multiplying the number of total untracked hits by a uniqueness percentage, the uniqueness percentage being a ratio of the number of unique tracked hits to the number of total tracked hits.

7. The method of claim 1, wherein at least one of the web browsers of the second plurality of requests has cookies features disabled.

8. A non-transitory computer-readable medium having instructions encoded thereon that, when executed by a processing device, cause the processing device to:

receive, by the processing device from a plurality of web browsers, a first plurality of requests for a web page and a second plurality of requests for the web page, wherein each of the first plurality of requests is associated with a tracking cookie returned by a web browser and each of the second plurality of requests is associated with a tracking cookie rejected by a web browser;

determine a number of total tracked hits to the web page corresponding to a number of requests in the first plurality of requests;

determine a number of unique tracked hits to the web page corresponding to a number of unique web browsers of the first plurality of requests, wherein the number of unique web browsers of the first plurality of requests is determined in view of the returned tracking cookies;

determine a number of total untracked hits to the web page corresponding to a number of requests in the second plurality of requests; and estimate, by the processing device, a number of unique untracked hits to the web page corresponding to a number of unique web browsers of the second plurality of requests, wherein the number of unique untracked hits to the web page is estimated in view of the number of total untracked hits to the web page, the number of unique tracked hits to the web page, and the number of total tracked hits to the web page.

9. The non-transitory computer-readable medium of claim 8, wherein at least one of the web browsers of the first plurality of requests has cookies features enabled.

10. The non-transitory computer-readable medium of claim 9, wherein at least one of the requests of the first plurality of requests comprises a previously stored tracking cookie associated with the web page.

11. The non-transitory computer-readable medium of claim 8, wherein the number of unique tracked hits to the web page is in view of a number of unique tracked hits to the web page during a predetermined time period.

12. The non-transitory computer-readable medium of claim 8, wherein the web page is a counting web page and the instruction cause the processing device further to:

receive a plurality of requests for a main web page from the plurality of web browsers;

determine whether each of the plurality of requests for the main web page comprises a tracking cookie;

selectively, in view of the determined, provide a tracking cookie to the plurality of web browsers; and redirect the web browsers to the counting web page.

13. The non-transitory computer-readable medium of claim 8, wherein the number of unique untracked hits is estimated by multiplying the number of total untracked hits by a ratio of the number of unique tracked hits to the number of total tracked hits.

14. The non-transitory computer-readable medium of claim 8, wherein at least one of the web browsers of the second plurality of requests has cookies features disabled.

15. A system comprising:

a storage device to store a web page; and a processing device operatively coupled to the storage device, wherein the processing device is configured to:

receive, from a plurality of web browsers, a first plurality of requests for the web page and a second plurality of requests for the web page, wherein each of the first plurality of requests is associated with a tracking cookie returned by a web browser and each of the second plurality of requests is associated with a tracking cookie rejected by a web browser;

determine a number of total tracked hits to the web page corresponding to a number of requests in the first plurality of requests;

determine a number of unique tracked hits to the web page corresponding to the number of unique web browsers of the first plurality of requests, wherein a number of unique web browsers of the first plurality of requests is determined in view of the returned tracking cookies;

determine a number of total untracked hits to the web page corresponding to a number of requests in the second plurality of requests; and estimate a number of unique untracked hits to the web page corresponding to a number of unique web browsers of the second plurality of requests, wherein the number of unique untracked hits to the web page is estimated in view of the number of total untracked hits to the web page, the number of unique tracked hits to the web page, and the number of total tracked hits to the web page.

16. The system of claim 15, wherein at least one of the web browsers of the first plurality of requests has cookies features enabled.

17. The system of claim 16, wherein at least one of the requests of the first plurality of requests comprises a previously stored tracking cookie associated with the web page.

18. The system of claim 15, wherein the number of unique tracked hits to the web page is in view of the number of unique tracked hits to the web page during a predetermined time period.

19. The system of claim 15, wherein the web page is a counting web page and the processing device is further configured to:

receive a plurality of requests for a main web page from the plurality of web browsers;

determine whether each of the plurality of requests for the main web page comprises a tracking cookie;

selectively, in view of the determined, provide a tracking cookie to the plurality of web browsers; and redirect the web browsers to the counting web page.

20. The system of claim 15, wherein the number of unique untracked hits is estimated by multiplying the number of total untracked hits by a uniqueness percentage, the uniqueness percentage being a ratio of the number of unique tracked hits to the number of total tracked hits.

21. The system of claim 15, wherein at least one of the web browsers of the second plurality of requests has cookies features disabled.

* * * * *